United States Patent
Pruitt et al.

(10) Patent No.: US 11,086,503 B2
(45) Date of Patent: Aug. 10, 2021

(54) REFLECTING ON-SCREEN VISUALS TO HARDWARE LIGHTING

(71) Applicant: Dell Products L.P., Round Rock, TX (US)

(72) Inventors: John S. Pruitt, Cedar Park, TX (US); Eric Summa, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/551,157

(22) Filed: Aug. 26, 2019

(65) Prior Publication Data

US 2021/0064223 A1     Mar. 4, 2021

(51) Int. Cl.
*G06F 3/023*     (2006.01)
*G06F 3/0484*     (2013.01)

(52) U.S. Cl.
CPC .......... *G06F 3/04847* (2013.01); *G06F 3/023* (2013.01)

(58) Field of Classification Search
CPC ......... G06T 7/90; G06T 7/11; G06F 3/04847; G06F 3/023
See application file for complete search history.

(56) References Cited

U.S. PATENT DOCUMENTS

| 10,212,793 B1* | 2/2019 | Plancherel | H05B 45/20 |
| 10,748,505 B1 | 8/2020 | Galiano et al. | |
| 2012/0206369 A1* | 8/2012 | Chou | G06F 3/0202 345/170 |
| 2014/0028565 A1* | 1/2014 | Gueorguiev | G09G 5/00 345/168 |
| 2018/0309920 A1* | 10/2018 | Arai | H04N 9/69 |

OTHER PUBLICATIONS

Cihan Topal et al., On The Efficiency Issues of Virtual Keyboard Design, Jul. 1, 2012, IEEE International Conference on VECIMS, pp. 38-42 (Year: 2012).*

Rahul Raguram et al., On the Privacy Risks of Virtual Keyboards: Automatic Reconstruction of Typed Input from Compromising Reflections, May 1, 2013, IEEE Transactions on Dependable and Secure Computing, vol. 10, No. 3, pp. 1-14 (Year: 2013).*

* cited by examiner

Primary Examiner — Tam T Tran
(74) Attorney, Agent, or Firm — Baker Botts L.L.P.

(57) ABSTRACT

Methods, systems, and computer programs encoded on computer storage medium, for providing, for display, an image on a GUI; partitioning the GUI into two or more cells, each cell of the GUI corresponding to a portion of the image; determining, for each cell of the two or more cells of the GUI, a predominant color of the cell of the GUI based on the portion of the image that corresponds to the cell of the GUI; partitioning an array of lights of a keyboard input device that corresponds to the display device into two or more cells, each cell of the array of lights corresponding to a particular cell of the cells of the GUI; adjusting, for each cell of the array of lights, a color output of the lights of the cell of the array of lights based on the predominant color of the corresponding cell of the GUI.

17 Claims, 7 Drawing Sheets
(3 of 7 Drawing Sheet(s) Filed in Color)

REFLECTING ON-SCREEN VISUALS TO HARDWARE LIGHTING

BACKGROUND

Field of the Disclosure

The disclosure relates generally to information handling systems, and in particular, reflecting on-screen visuals to hardware lighting of the information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computing systems and peripherals can have a capability for differing lighting effects, such as static or color cycle lighting.

SUMMARY

Innovative aspects of the subject matter described in this specification may be embodied in a method including providing, for display, an image on a graphical user interface (GUI) of a display device; partitioning the GUI into two or more cells, each cell of the GUI corresponding to a portion of the image; determining, for each cell of the two or more cells of the GUI, a predominant color of the cell of the GUI based on the portion of the image that corresponds to the cell of the GUI; partitioning an array of lights of a keyboard input device that corresponds to the display device into two or more cells, each cell of the array of lights corresponding to a particular cell of the cells of the GUI; and adjusting, for each cell of the array of lights, a color output of the lights of the cell of the array of lights based on the predominant color of the corresponding cell of the GUI.

Other embodiments of these aspects include corresponding system, apparatus, and computer programs, configured to perform the actions of the methods, encoded on computer storage devices.

These and other embodiments may each optionally include one or more of the following features. For instance, a number of cells of the GUI is the same as a number of cells of the array of lights. After adjusting, for each cell of the array of lights, the color output of the lights of the cell of the array of lights based on the predominant color of the corresponding cell of the GUI: providing, for display, an additional image on the GUI of the display device; determining, for each cell of the two or more cells of the GUI, an additional predominant color of the cell of the GUI based on a portion of the additional image that corresponds to the cell of the GUI; adjusting, for each cell of the array of lights, the color output of the lights of the cell of the array of lights based on the additional predominant color of the corresponding cell of the GUI. Identifying a first cell of the GUI and a second cell of the GUI that is adjacent to the first cell of the GUI; averaging the predominant colors of the first cell of the GUI and the second cell of the GUI to identify an averaged predominant color of the first and the second cell of the GUI; and adjusting, for a first cell of the array of lights that corresponds to the first cell of the GUI, the color output of the lights of the cell of the array of lights based on the averaged predominant color. Adjusting, for the first cell of the array of lights that corresponds to the first cell of the GUI, the color output of the lights at an edge of the first cell that is adjacent to a second cell of the array of lights that corresponds to the second cell of the GUI, the adjustment based on the average predominant color. Identifying a number of lights of the array of lights of the keyboard input device that corresponds to the display device; and partitioning the GUI into a number of cells based on the number of lights of the array of lights of the keyboard input device that corresponds to the display device. An orientation of the cells of the array of lights is substantially the same as an orientation of the cells of the GUI.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present disclosure and its features and advantages, reference is now made to the following description, taken in conjunction with the accompanying drawings which illustrate examples of the disclosure, and which may be combined with one another and with all other written and illustrated portions of this disclosure, unless clearly mutually exclusive.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Figure 1:
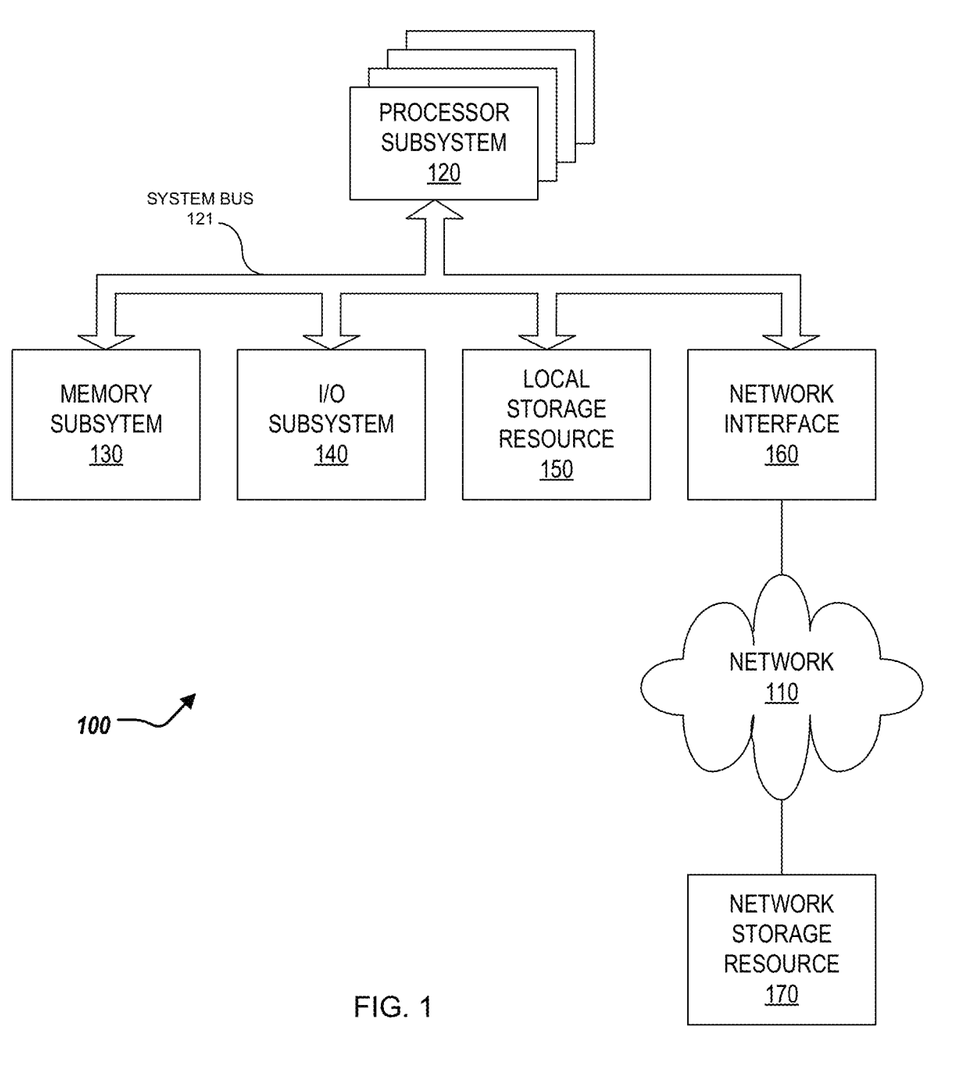
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
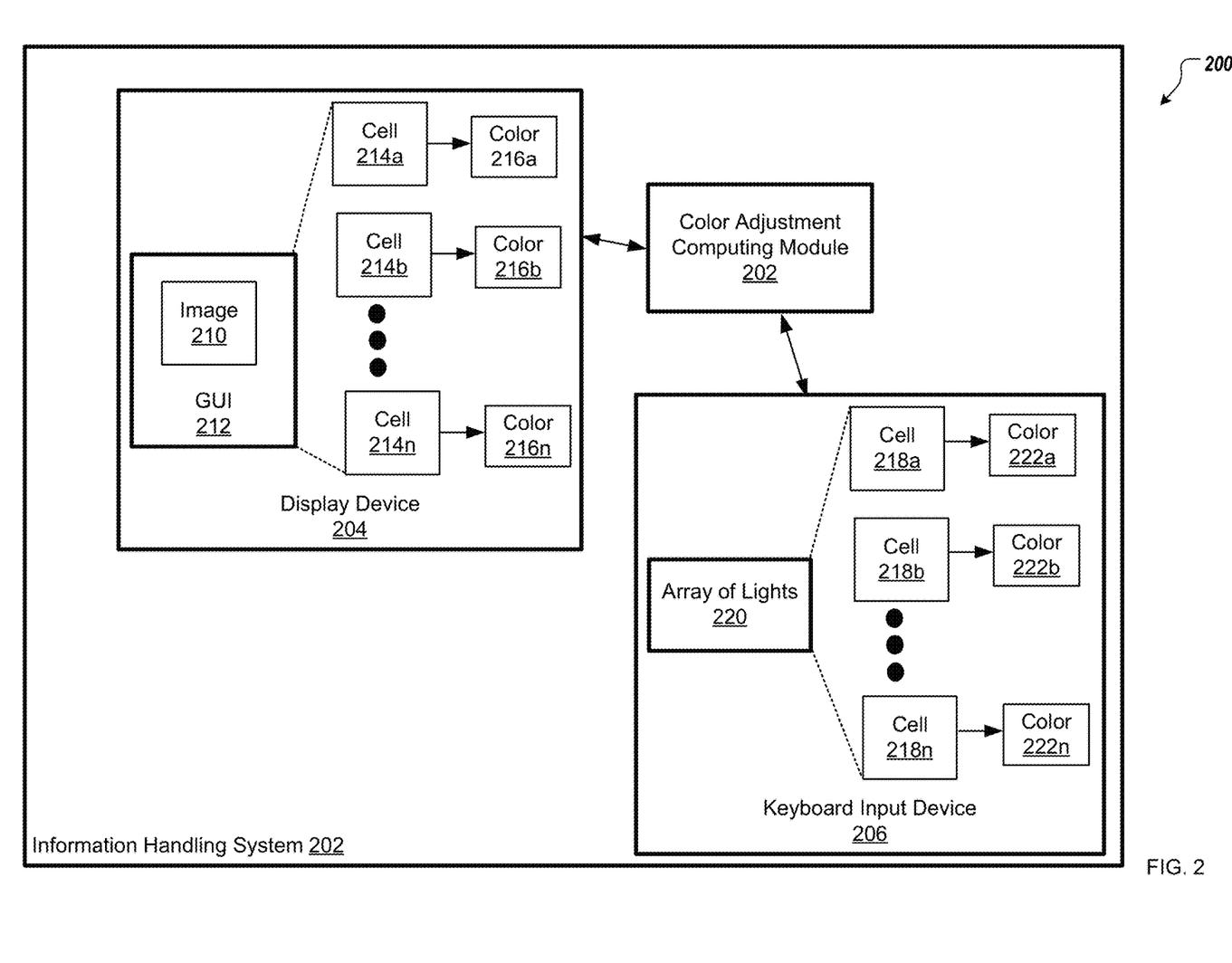
FIG. 2 is a block diagram of an information handling system for reflecting on-screen visuals to hardware lighting.

Turning now to FIG. 2, FIG. 2 illustrates a computing environment 200 for reflecting on-screen visuals to hardware lighting. The computing environment 200 includes at least a portion of an information handling system (IHS) 200. The IHS 200 can include a color adjustment computing module 202, a display device 204, and a keyboard input device 206. The color adjustment computing module 202 can be in communication with the display device 204 and the keyboard input device 206 with a software controllable array of lights 220 (described further herein). In some examples, the IHS 200 can be similar to the information handling system 100 of FIG. 1.

Figure 3A:
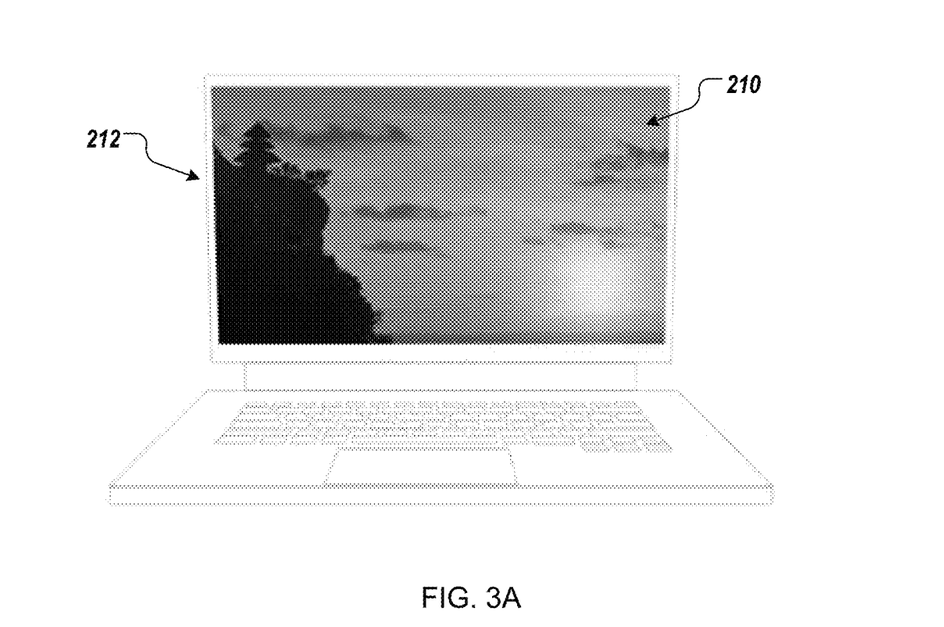
FIGS. 3A-3E illustrate graphical user interfaces for reflecting on-screen visuals to hardware lighting.

The display device 204 can provide for display an image 210 on a graphical user interface (GUI) 212 of the display device 204. For example, FIG. 3A illustrates the image 210 being displayed by the GUI 212. In some examples, the GUI 212 can include a desktop background image or a video.

Figure 3B:
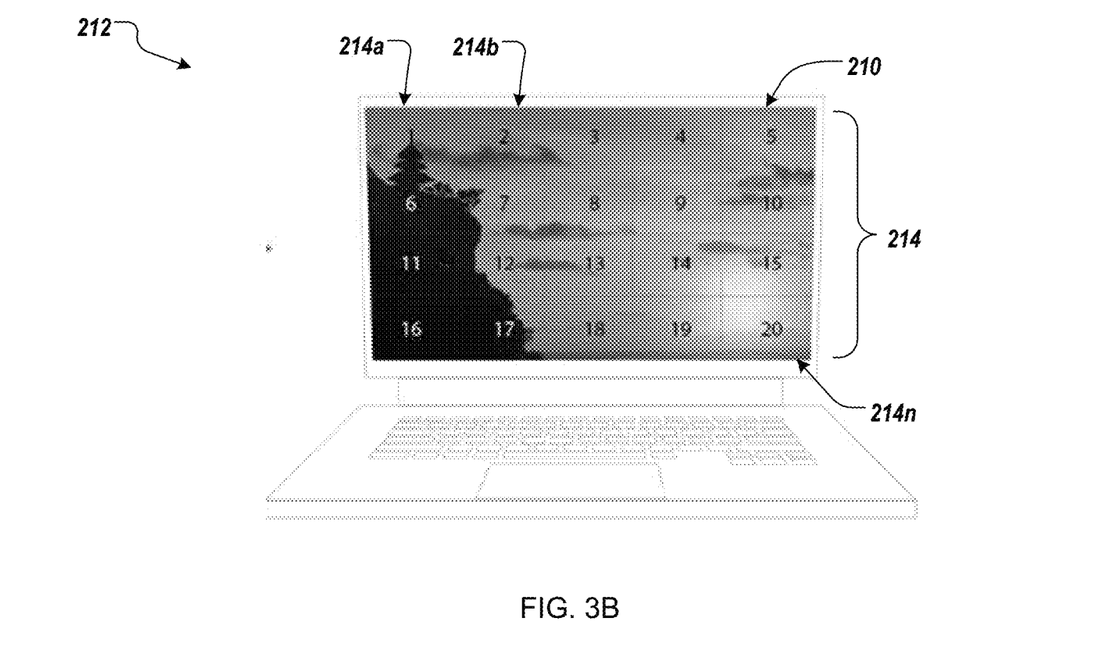

The color adjustment computing module 202 can partition the GUI 212 into cells 214a, 214b, . . . , 214n (collectively referred to as cells 214). Each of the cells 214 corresponds to a portion of the image 210. For example, FIG. 3B illustrates the image 210 including cells 214 (numbered 1, 2, . . . , 20). In other words, the color adjustment computing module 202 can divide (or partition) the GUI 212 into a matrix of cells (cells 214). In the illustrated example, the color adjustment computing module 202 partitions the GUI 212 into a 5 by 4 matrix (or array) of cells 214 to form 20 such cells 214. However, the color adjustment computing module 202 can partition the GUI 212 into any number of cells 214 and any arrangement of cells (e.g. 10 by 10 cells or 2 by 8 cells). In some examples, the color adjustment computing module 202 partitions the GUI 212 based on the image 210, and presentation of features of the image 210. In some examples, one or more of the cells 214 are of differing size than the remaining cells 214. In some examples, each of the cells 214 are of substantially the same size. In some examples, each of the cells 214 is of the same geometric shape (e.g., square or rectangular). In some examples, one or more of the cells 214 are of differing geometric shape (e.g., rectangular) than the geometric shape of the remaining cells 214 (e.g., square).

Figure 3C:
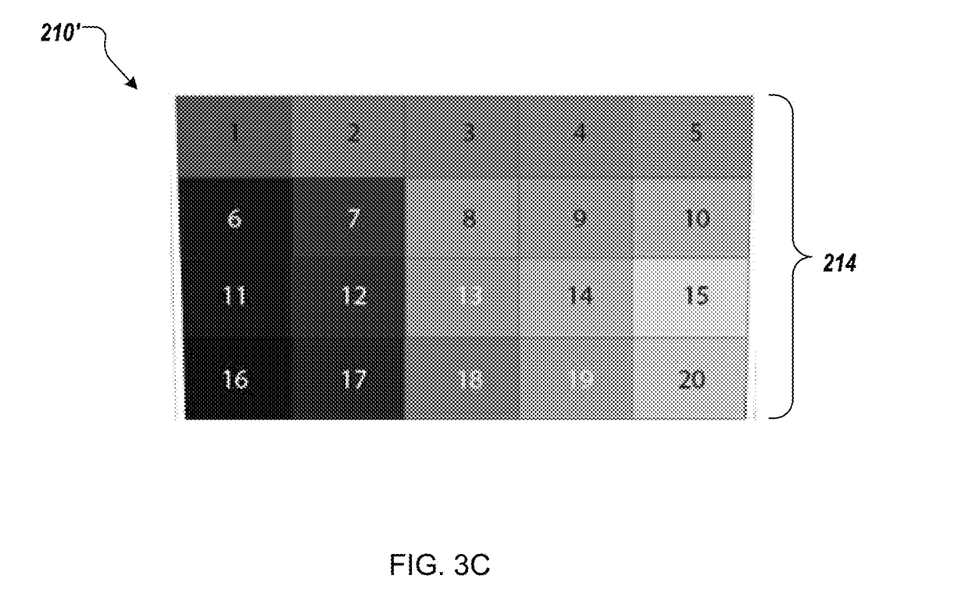

The color adjustment computing module 202 can determine, for each cell 214, a predominant color 216 of the cell 214 based on the portion of the image 210 that corresponds to the cell 214. In other words, the color adjustment computing module 202 can "simplify" each of the cells 214 to its predominant color 216 (shown as colors 216a, 216b, . . . , 216n) based on the portion of the image 210 that corresponds to the cell 214. For example, FIG. 3C illustrates a color-predominant image representation 210' of the image 210. The image representation 210' can include, for each cell 214, a representation of the predominant color of the cell 214 (based on the portion of the image 210 that corresponds to the cell 214).

Figure 4:
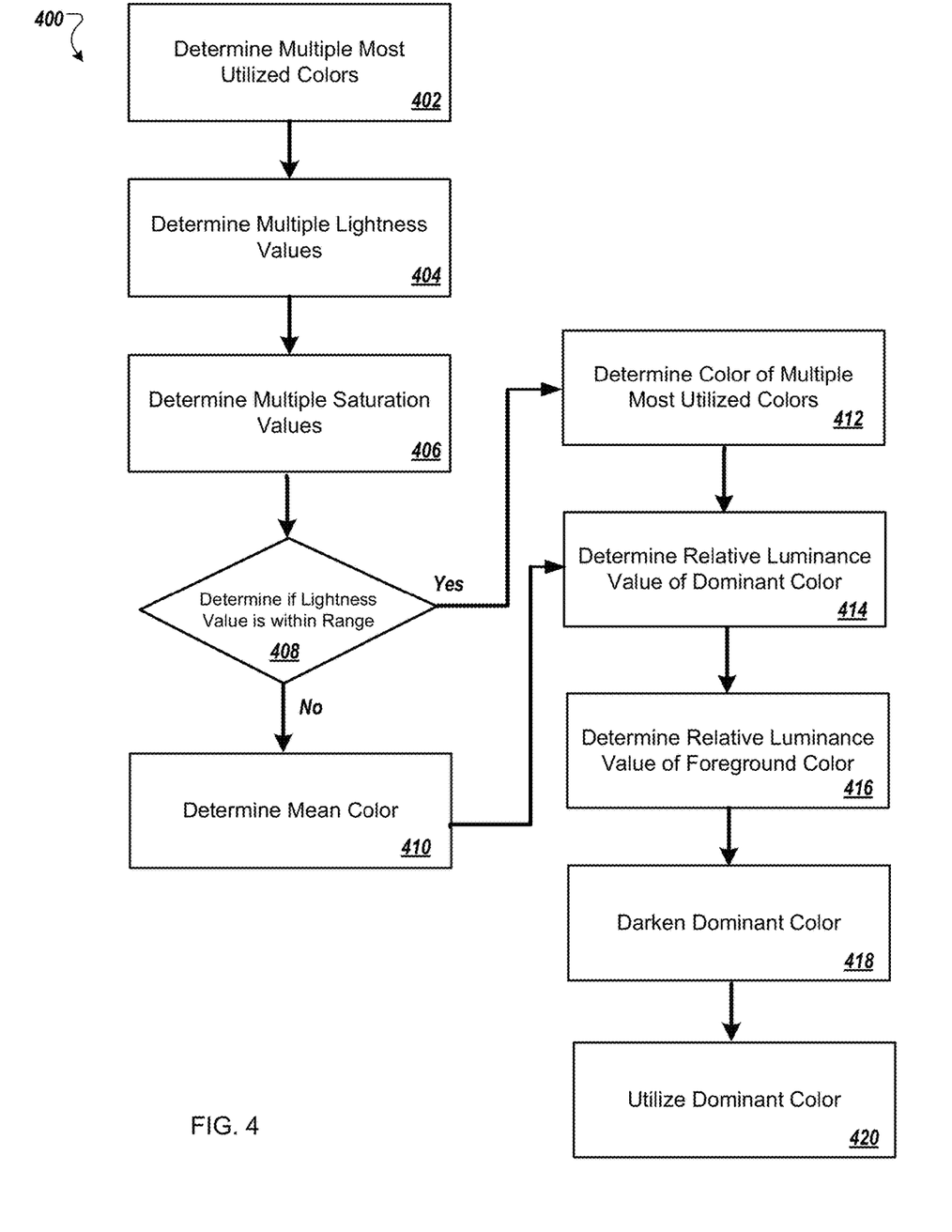
FIG. 4 is a flowchart for determining the predominant color of an image.

FIG. 4 illustrates an example method 400 for the color adjustment computing module 202 to determine, for each cell 214, the predominant color of the cell 214 based on the portion of the image 210 that corresponds to the cell 214. Specifically, the example method 400 is described as referring to a particular cell 214 of the cells 214, and can be applicable to any of the cells 214.

At 402, multiple most utilized colors of the portion of the image 210 that corresponds to the cell 214 is determined. For example, sixteen most utilized colors of the portion of the image 210 that corresponds to the cell 214 is determined. At 404, multiple lightness values respectively associated with the multiple most utilized colors of the portion of the image 210 that corresponds to the cell 214 is determined. In some examples, determining a lightness value from a color may include utilizing a mapping of red, green, and blue values of the color. In some examples, determining a lightness value from a color may include determining an arithmetic mean of the red, green, and blue values of the color. In some examples, determining a lightness value from a color may include determining an arithmetic mean of a sum of a maximum of the red, green, and blue values of the color and a minimum of the red, green, and blue values.

At 406, multiple saturation values respectively associated with the multiple most utilized colors of the portion of the image 210 that corresponds to the cell 214 and respectively associated with the multiple lightness values is determined. In some examples, saturation of a color may be determined by a combination of light intensity and how much it is distributed across a spectrum of different wavelengths. For example, a saturation value may be a colorfulness of a color judged in proportion to its brightness. For instance, saturation may provide an effect that may be perceived as freedom from whitishness of light coming from the color. In some examples, a saturation value associated with a color may be determined to be zero if a lightness associated the color is zero. In some examples, a saturation value associated with a color may be determined to be zero if a lightness associated the color is one. In some examples, saturation in a HSL (Hue Saturation Lightness) model may be:

$$\frac{\max(R, G, B) - \min(R, G, B)}{1 - |\max(R, G, B) - \min(R, G, B) - 1|}.$$

At 408, it is determined if a lightness value of the multiple lightness values is within a range of lightness values and if a saturation value respectively associated with the lightness value is above a threshold value. In some examples, the range of lightness values may be from ninety (90) to one hundred and eighty (180). In some examples, other ranges may be utilized. In some examples, the threshold value may be fifty (50). In some examples, other threshold values may be utilized.

If the lightness value of the multiple lightness values is not within the range of lightness values or if the saturation value respectively associated with the lightness value is not above the threshold value, a mean color from the multiple most utilized colors of the portion of the image 210 that corresponds to the cell 214 as a dominant color is determined, at 410. In some examples, determining a mean color from the multiple most utilized colors of the portion of the image 210 that corresponds to the cell 214 as a dominant color may include determining an arithmetic mean of the multiple most utilized colors of the portion of the image 210 that corresponds to the cell 214 as a dominant color. In some examples, determining a mean color from the multiple most utilized colors of the portion of the image 210 that corresponds to the cell 214 as a dominant color may include determining a geometric mean of the multiple most utilized colors of the portion of the image 210 that corresponds to the cell 214 as a dominant color.

If the lightness value of the multiple lightness values is within the range of lightness values and if the saturation value respectively associated with the lightness value is above the threshold value, a color of the multiple most utilized colors of the portion of the image 210 that corresponds to the cell 214 that is associated with the lightness value of the multiple lightness values within the range of lightness values and with the saturation value respectively associated with the lightness value may be determined as the dominant color, at 412.

At 414, a relative luminance value of the dominant color may be determined. In some examples, determining a relative luminance value from a color may include utilizing normalized red, green, and blue values of the color. For example, color values of R, G, and B may be normalized with respect to two hundred and fifty-five (255) (e.g., color values of R, G, and B may be eight-bit values). In one instance, $R_N = R/255$. In a second instance, $G_N = G/255$. In another instance, $B_N = B/255$. In some examples, determining a relative luminance value from a color may include determining a sum of a product of 0.2126 and $R_P$, a product of 0.7152 and $G_P$, and a product of 0.0722 and $B_P$. In one example, $R_P$ may be $R_N$ divided by 12.92 if $R_N$ is less than or equal to $K_0$; otherwise, $R_P$ may be $((R_N+0.055)/1.055)^{2.4}$. For instance, $$R_P = \begin{cases} \frac{R_N}{12.92} & \text{if } R_N \leq K_0 \\ \left(\frac{R_N + 0.055}{1.055}\right)^{2.4} & \text{otherwise} \end{cases}.$$

$K_0$ may be a constant. $K_0$ may be chosen based at least on an implementation, e.g., $K_0$ may be 0.03928, 0.04045, etc.

In a second example, $G_P$ may be $G_N$ divided by 12.92 if $G_N$ is less than or equal to $K_0$; otherwise $G_P$ may be $((G_N+0.055)/1.055)^{2.4}$. For instance, $$G_P = \begin{cases} \frac{G_N}{12.92} & \text{if } G_N \leq K_0 \\ \left(\frac{G_N + 0.055}{1.055}\right)^{2.4} & \text{otherwise} \end{cases}.$$

$K_0$ may be a constant. $K_0$ may be chosen based at least on an implementation, e.g., $K_0$ may be 0.03928, 0.04045, etc. In another example, $B_P$ may be $B_N$ divided by 12.92 if $B_N$ is less than or equal to $K_0$; otherwise $B_P$ may be $((B_N+0.055)/1.055)^{2.4}$. For instance, $$B_P = \begin{cases} \frac{B_N}{12.92} & \text{if } B_N \leq K_0 \\ \left(\frac{B_N + 0.055}{1.055}\right)^{2.4} & \text{otherwise} \end{cases}.$$

$K_0$ may be a constant. $K_0$ may be chosen based at least on an implementation, e.g., $K_0$ may be 0.03928, 0.04045, etc.

At 416, a relative luminance value of a foreground color may be determined. In some examples, relative luminance value of the foreground color may be determined via one or more methods, one or more processes, and/or one or more systems described herein.

At 418, the dominant color may be repeatedly darkened by an amount until a ratio between the relative luminance value of the foreground color ($RL_{foreground}$) and the relative luminance value of the dominant color ($RL_{background}$) is within a range of a target ratio. For example, the dominant color may be repeatedly darkened by an amount until $$\frac{RL_{foreground}}{RL_{background}} \approx \text{Target Ratio}.$$

In one instance, the target ratio may be four and one half (4.5). In another instance, the ratio between the relative luminance value of the foreground color and the relative luminance value of the dominant color may be four and one half to one (4.5:1). In one or more embodiments, $RL_{foreground}$ may be modified by a constant and/or $RL_{background}$ may be modified by a constant. For example, the dominant color may be repeatedly darkened by an amount until $$\frac{RL_{foreground} + 0.05}{RL_{background} + 0.05} \approx \text{Target Ratio}.$$

For instance, the target ratio may be four and one half (4.5).

In some examples, other target ratios between the relative luminance value of the foreground color and the relative luminance value of the dominant color may be utilized. In some examples, a range of a target ratio may be a percentage. For example, the dominant color may be repeatedly darkened by the amount until the ratio between the relative luminance value of the foreground color and the relative luminance value of the dominant color is within a percentage of the target ratio. In some examples, the dominant color may be repeatedly darkened by an amount until a ratio between the relative luminance value of the foreground color and the relative luminance value of the dominant color is within a range of a target ratio.

At 420, the dominant color may be utilized for the cell 214 in the color-predominant image representation 210' of the image 210, as shown in FIG. 3C.

Figure 3D:
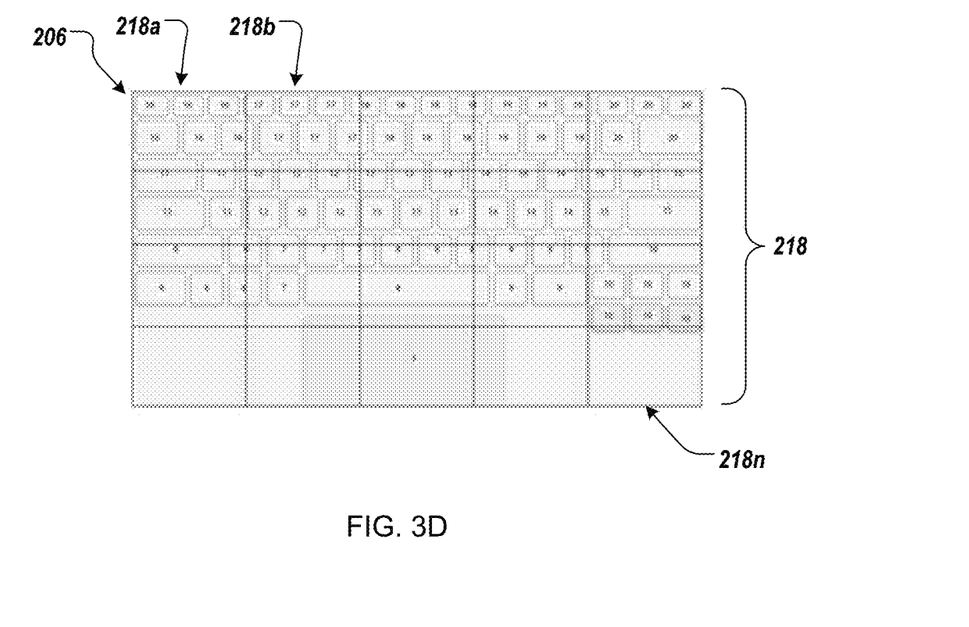

The color adjustment computing module 202 can partition an array of lights 220 of the keyboard input device 206 into cells 218a, 218b, . . . , 218n (collectively referred to as cells 218). Each of the cells 218 of the array of lights 220 can correspond to a particular cell 214 of the GUI 212. In other words, the array of lights 220 (e.g., hardware lighting) that is physically directly underneath the keyboard input device 206 can be divided (partitioned) into a matrix. The array of lights 220 can include LED-based lights. Each cell 218 can correspond to one or more lights of the array of lights 220. For example, FIG. 3D illustrates the keyboard input device 206 with the underlying array of lights 220 including cells 218. In other words, the color adjustment computing module 202 can divide (or partition) the array of lights into a matrix of cells (cells 218). In the illustrated example, the color adjustment computing module 202 partitions the array of lights 220 into a 5 by 4 matrix (or array) of cells 218 to form 20 such cells 220. However, the color adjustment computing module 202 can partition the array of lights 220 into any number of cells 218 and any arrangement of cells (e.g., 10 by 10 cells or 2 by 8 cells). In some examples, one or more of the cells 218 are of differing size that the remaining cells 218. In some examples, each of the cells 218 are of substantially the same size. In some examples, each of the cells 218 is of the same geometric shape (e.g., square or rectangular). In some examples, one or more of the cells 218 are of differing geometric shape (e.g., rectangular) than the geometric shape of the remaining cells 218 (e.g., square).

In some examples, a number of cells 214 of the GUI 212 is the same as a number of cells 218 of the array of lights 220.

In some examples, the orientation of the cells 218 of the array of lights 220 is substantially the same as an orientation of the cells 214 of the GUI 212. For example, the cell 218a corresponds to the cell 214a; the cell 218b corresponds to the cell 214b; and the cell 218n corresponds to the cell 214n.

In some examples, the color adjustment computing module 202 can identify a number of lights of the array of lights 220. The color adjustment computing module 202 can partition the GUI 212 into the cells 214 based on the number of lights of the array of lights 220. That is, as the number of lights of the array of lights 220 increases, the number of cells 214 that the GUI 212 is partitioned into can increase.

Figure 3E:
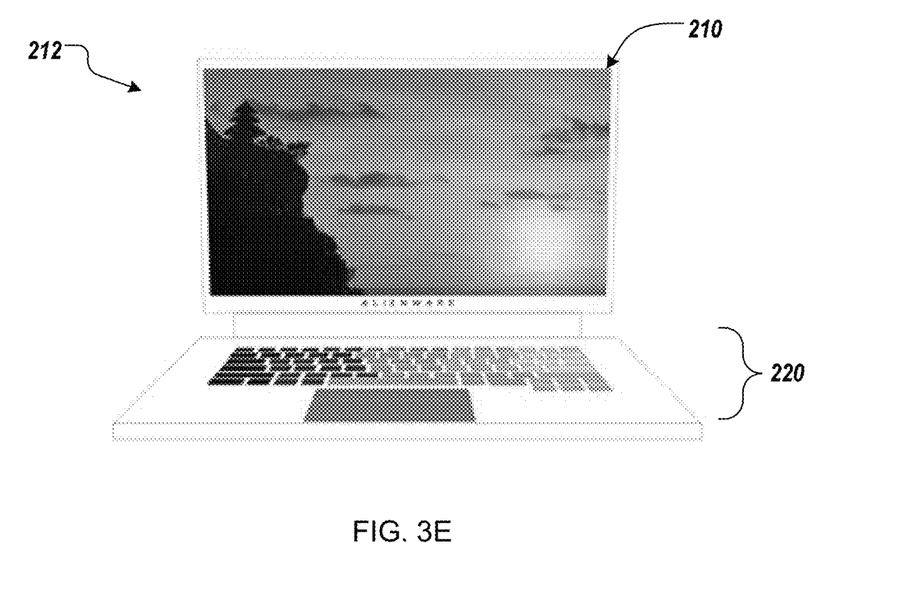

In some implementations, the color adjustment computing module 202 adjusts, for each cell 218 of the array of lights 220, a color 222 output of the lights of the cell 218 of the array of lights 220 based on the predominant color 216 of the corresponding cell 214 of the GUI 212. In other words, the colors 216 of the cells 218 of the GUI 212 (e.g., the image 210) are reflected/replicated by the colors 222 (shown as colors, 222a, 222b, . . . 222n) of the array of lights 220. For example, the color adjustment computing module 202 adjusts the color 222a of the cell 218a of the array of lights 220 based on the color 216a of the corresponding cell 214a; adjusts the color 222b of the cell 218b of the array of lights 220 based on the color 216b of the corresponding cell 214b; and adjusts the color 222n of the cell 218n of the array of lights 220 based on the color 216n of the corresponding cell 214n. FIG. 3E illustrates the image 210 being displayed by the GUI 212 and the array of lights 220 output corresponding colors 222 based on the image 210.

In some examples, a key of the keyboard input device 206 can be in superimposition with two or more cells 218 of the array of lights 220. The color adjustment computing module 202 can determine an average (or equalization) of the predominant colors 216 of the corresponding cells 214 of the GUI 212 for the two or more cells 218. The color adjustment computing module 202 can adjust, for cell 218 of the two or more cells 218 of the array of lights 218, the color 222 output of the lights of the cell 218 of the array of lights 220 based on the averaged predominant color 216 of the corresponding cells 214 of the GUI 212 for the two or more cells 218.

In some examples, after adjusting, for each cell 218 of the array of lights 220, the color 222 output by the array of lights 220, the display device 204 provides a second image on the GUI 212. Similar to that mentioned above, the color adjustment computing module 202 can determine, for each cell 214 of the GUI 212, an additional predominant color of the cell 214 based on a portion of the additional image that corresponds to the cell 214. Additionally, similar to that mentioned above, the color adjustment computing module 202 can adjust, for each cell 218 of the array of lights 220, the color output of the lights of the cell 218 based on the additional predominant color of the corresponding cell 214 of the GUI 212.

In some examples, the color adjustment computing module 202 can identify the cell 214a of the GUI 212 that is adjacent to the cell 214b of the GUI 212. The color adjustment computing module 202 can apply an averaging algorithm to the colors 216a, 216b of the cells 214a, 214b, respectively. Specifically, the color adjustment computing module 202 can average the predominant colors 216a, 216b to identify an averaged predominant color of the cells 214a, 214b. The color adjustment computing module 202 can adjust, for the cell 218a of the array of lights 220 that corresponds to the cell 214a of the GUI 210, the color 222a of the cell 218a based on the averaged predominant color. Furthermore, the color adjustment computing module 202 can adjust, for the cell 218b of the array of lights 220 that corresponds to the cell 214b of the GUI 210, the color 222b of the cell 218b based on the averaged predominant color. In some examples, the color adjustment computing module 202 adjusts the color 222a of the cell 218a at an edge of the cell 218a that is adjacent to the cell 218b. The adjustment can be based on the average predominant color.

Figure 5:
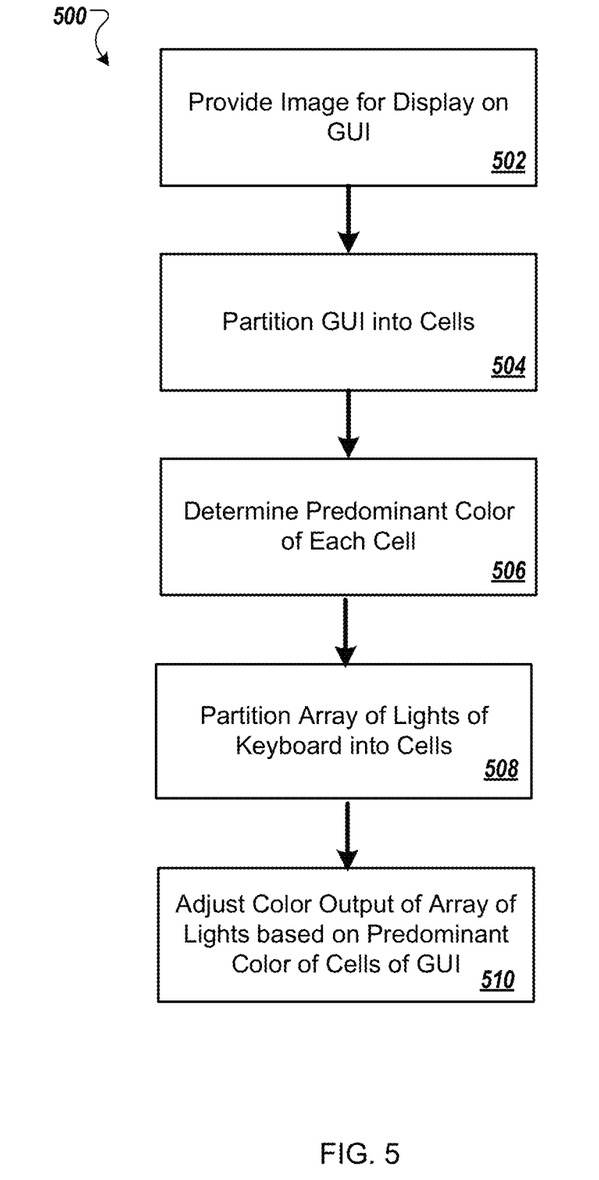
FIG. 5 is a flowchart for reflecting on-screen visuals to hardware lighting.

FIG. 5 illustrates a flowchart depicting selected elements of a method 500 for reflecting on-screen visuals to hardware lighting (array of lights 220). The method 500 may be performed by the information handling system 100, the IHS 200, and/or the color adjustment computing module 202, described herein with reference to FIGS. 1 and 2, or another information handling system. It is noted that certain operations described in method 500 may be optional or may be rearranged in different embodiments.

The display device 204 can provide for display the image 210 on the GUI 212 of the display device 204 (502). The color adjustment computing module 202 can partition the GUI 212 into the cells 214 (504). Each of the cells 214 corresponds to a portion of the image 210. The color adjustment computing module 202 can determine, for each cell 214, the predominant color 216 of the cell 214 based on the portion of the image 210 that corresponds to the cell 214 (506). The color adjustment computing module 202 can partition the array of lights 220 of the keyboard input device 206 into the cells 218 (508) Each of the cells 218 of the array of lights 220 can correspond to a particular cell 214 of the GUI 212. The color adjustment computing module 202 adjusts, for each cell 218 of the array of lights 220, the color 222 output of the lights of the cell 218 of the array of lights 220 based on the predominant color 216 of the corresponding cell 214 of the GUI 212 (510).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
   identifying a number of lights of an array of lights of a keyboard input device;
   providing, for display, an image on a graphical user interface (GUI) of a display device, the display device corresponding to the keyboard input device;
   partitioning the GUI into a plurality of cells based on the number of lights of the array of lights of the keyboard input device, wherein each cell of the GUI corresponding to a portion of the image;
   determining, for each cell of the plurality of cells of the GUI, a predominant color of the cell of the GUI based on the portion of the image that corresponds to the cell of the GUI;
   partitioning the array of lights of the keyboard input device into two or more cells, each cell of the array of lights corresponding to a particular cell of the plurality of cells of the GUI;
   adjusting, for each cell of the array of lights, a color output of the lights of the cell of the array of lights based on the predominant color of the corresponding cell of the GUI;
   determining that a particular key of the keyboard input device is in superimposition with two or more particular cells of the array of lights;
   in response to determining that the particular key of the keyboard input device is in superimposition with two or more particular cells of the array of lights, determining an average predominate color of each of the two or more particular cells of the array of lights; and
   adjusting, for each of the two or more particular cells of the array of lights, the color output of the lights of the two or more particular cells based on the averaged predominant color.

2. The computer-implemented method of claim 1, wherein a number of cells of the GUI is the same as a number of cells of the array of lights.

3. The computer-implemented method of claim 1, further comprising:
   after adjusting, for each cell of the array of lights, the color output of the lights of the cell of the array of lights based on the predominant color of the corresponding cell of the GUI:
      providing, for display, an additional image on the GUI of the display device;
      determining, for each cell of the plurality of cells of the GUI, an additional predominant color of the cell of the GUI based on a portion of the additional image that corresponds to the cell of the GUI;
      adjusting, for each cell of the array of lights, the color output of the lights of the cell of the array of lights based on the additional predominant color of the corresponding cell of the GUI.

4. The computer-implemented method of claim 1, further comprising:
   identifying a first cell of the GUI and a second cell of the GUI that is adjacent to the first cell of the GUI;
   averaging the predominant colors of the first cell of the GUI and the second cell of the GUI to identify an averaged predominant color of the first and the second cell of the GUI; and
   adjusting, for a first cell of the array of lights that corresponds to the first cell of the GUI, the color output of the lights of the cell of the array of lights based on the averaged predominant color.

5. The computer-implemented method of claim 4, wherein adjusting the color output further comprising:
   adjusting, for the first cell of the array of lights that corresponds to the first cell of the GUI, the color output of the lights at an edge of the first cell that is adjacent to a second cell of the array of lights that corresponds to the second cell of the GUI, the adjustment based on the average predominant color.

6. The computer-implemented method of claim 1, wherein an orientation of the cells of the array of lights is the same as an orientation of the cells of the GUI.

7. An information handling system, comprising:
   a display device providing for display an image on a graphical user interface (GUI);
   a keyboard input device including array of lights that corresponds to the display device;
   a color adjustment computing module configured to:
      identifying a number of lights of the array of lights of the keyboard input device;

partition the GUI into plurality of cells based on the number of lights of the array of lights of the keyboard input device, wherein each cell of the GUI corresponding to a portion of the image;

determine, for each cell of the plurality of cells of the GUI, a predominant color of the cell of the GUI based on the portion of the image that corresponds to the cell of the GUI;

partition the array of lights of a keyboard input device into two or more cells, each cell of the array of lights corresponding to a particular cell of the plurality of cells of the GUI;

adjust, for each cell of the array of lights, a color output of the lights of the cell of the array of lights based on the predominant color of the corresponding cell of the GUI;

determining that a particular key of the keyboard input device is in superimposition with two or more particular cells of the array of lights;

in response to determining that the particular key of the keyboard input device is in superimposition with two or more particular cells of the array of lights, determining an average predominate color of each of the two or more particular cells of the array of lights; and adjusting, for each of the two or more particular cells of the array of lights, the color output of the lights of the two or more particular cells based on the averaged predominant color.

8. The information handling system of claim 7, wherein a number of cells of the GUI is the same as a number of cells of the array of lights.

9. The information handling system of claim 7, the operations further comprising:

after adjusting, for each cell of the array of lights, the color output of the lights of the cell of the array of lights based on the predominant color of the corresponding cell of the GUI:

providing, for display, an additional image on the GUI of the display device;

determining, for each cell of the plurality of cells of the GUI, an additional predominant color of the cell of the GUI based on a portion of the additional image that corresponds to the cell of the GUI;

adjusting, for each cell of the array of lights, the color output of the lights of the cell of the array of lights based on the additional predominant color of the corresponding cell of the GUI.

10. The information handling system of claim 7, the operations further comprising:

identifying a first cell of the GUI and a second cell of the GUI that is adjacent to the first cell of the GUI;

averaging the predominant colors of the first cell of the GUI and the second cell of the GUI to identify an averaged predominant color of the first and the second cell of the GUI; and adjusting, for a first cell of the array of lights that corresponds to the first cell of the GUI, the color output of the lights of the cell of the array of lights based on the averaged predominant color.

11. The information handling system of claim 10, wherein adjusting the color output further comprising:

adjusting, for the first cell of the array of lights that corresponds to the first cell of the GUI, the color output of the lights at an edge of the first cell that is adjacent to a second cell of the array of lights that corresponds to the second cell of the GUI, the adjustment based on the average predominant color.

12. The information handling system of claim 7, wherein an orientation of the cells of the array of lights is the same as an orientation of the cells of the GUI.

13. A non-transitory computer-readable medium storing software comprising instructions executable by one or more computers which, upon such execution, cause the one or more computers to perform operations comprising:

identifying a number of lights of an array of lights of a keyboard input device;

providing, for display, an image on a graphical user interface (GUI) of a display device, the display device corresponding to the keyboard input device;

partitioning the GUI into plurality of cells based on the number of lights of the array of lights of the keyboard input device, wherein each cell of the GUI corresponding to a portion of the image;

determining, for each cell of the plurality of cells of the GUI, a predominant color of the cell of the GUI based on the portion of the image that corresponds to the cell of the GUI;

partitioning the array of lights of the keyboard input device into two or more cells, each cell of the array of lights corresponding to a particular cell of the plurality of cells of the GUI;

adjusting, for each cell of the array of lights, a color output of the lights of the cell of the array of lights based on the predominant color of the corresponding cell of the GUI;

determining that a particular key of the keyboard input device is in superimposition with two or more particular cells of the array of lights;

in response to determining that the particular key of the keyboard input device is in superimposition with two or more particular cells of the array of lights, determining an average predominate color of each of the two or more particular cells of the array of lights; and adjusting, for each of the two or more particular cells of the array of lights, the color output of the lights of the two or more particular cells based on the averaged predominant color.

14. The computer-readable medium of claim 13, wherein a number of cells of the GUI is the same as a number of cells of the array of lights.

15. The computer-readable medium of claim 13, the operations further comprising:

after adjusting, for each cell of the array of lights, the color output of the lights of the cell of the array of lights based on the predominant color of the corresponding cell of the GUI:

providing, for display, an additional image on the GUI of the display device;

determining, for each cell of the plurality of cells of the GUI, an additional predominant color of the cell of the GUI based on a portion of the additional image that corresponds to the cell of the GUI;

adjusting, for each cell of the array of lights, the color output of the lights of the cell of the array of lights based on the additional predominant color of the corresponding cell of the GUI.

16. The computer-readable medium of claim 13, the operations further comprising:

identifying a first cell of the GUI and a second cell of the GUI that is adjacent to the first cell of the GUI;

averaging the predominant colors of the first cell of the GUI and the second cell of the GUI to identify an averaged predominant color of the first and the second cell of the GUI; and adjusting, for a first cell of the array of lights that corresponds to the first cell of the GUI, the color output of the lights of the cell of the array of lights based on the averaged predominant color.

17. The computer-readable medium of claim 16, wherein adjusting the color output further comprising:
   adjusting, for the first cell of the array of lights that corresponds to the first cell of the GUI, the color output of the lights at an edge of the first cell that is adjacent to a second cell of the array of lights that corresponds to the second cell of the GUI, the adjustment based on the average predominant color.

* * * * *